Aug. 5, 1941.    E. W. JOHNSON    2,251,283
RECLOSABLE BOX
Original Filed Nov. 30, 1936    4 Sheets-Sheet 1
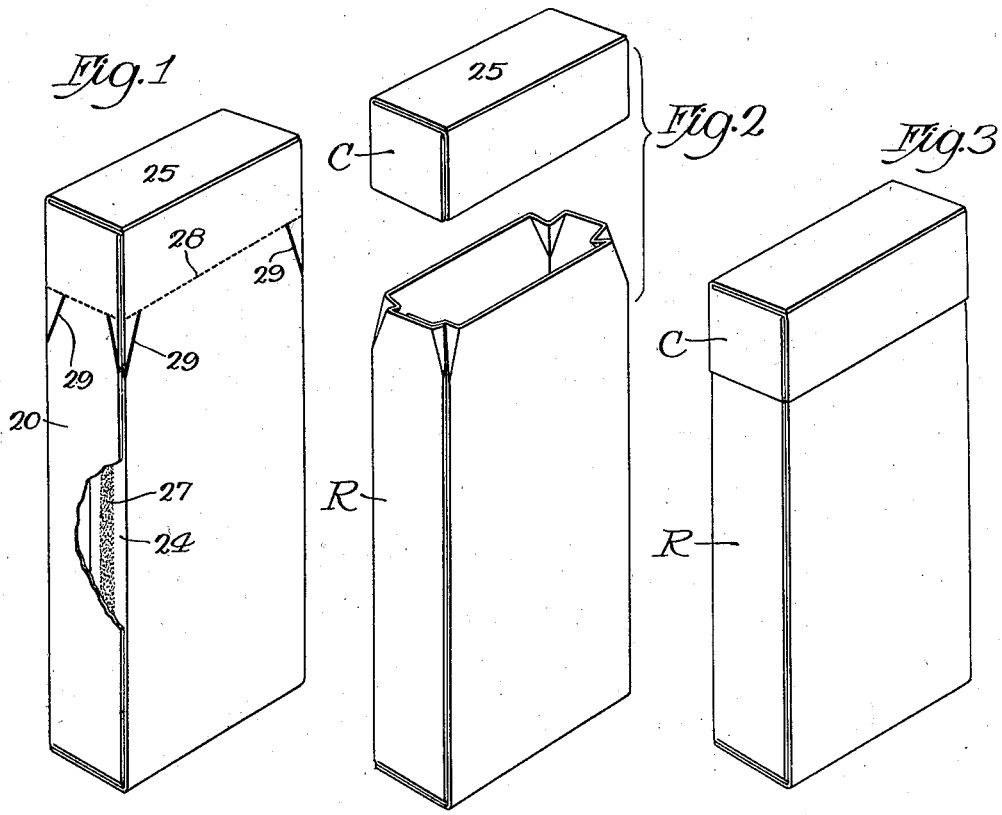
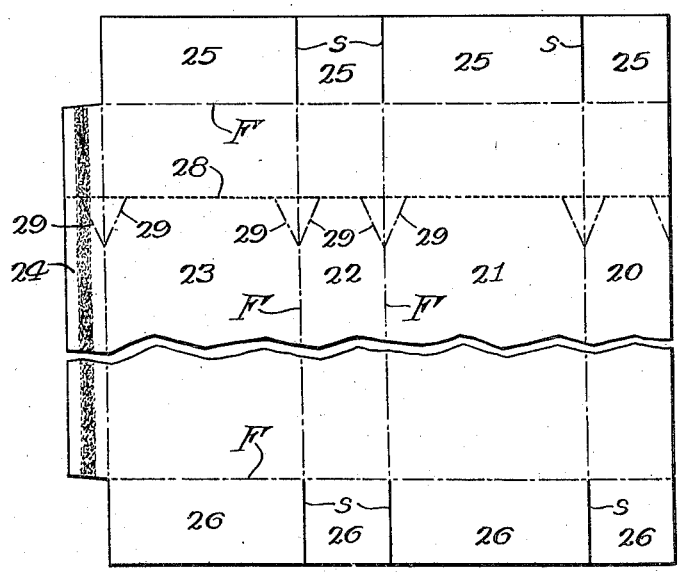
Inventor:
Edward W. Johnson Aug. 5, 1941.   E. W. JOHNSON   2,251,283
RECLOSABLE BOX
Original Filed Nov. 30, 1936   4 Sheets-Sheet 2

Inventor:
Edward W. Johnson
By Fisher, Clapp, Soans & Pond Attys.

Aug. 5, 1941.  E. W. JOHNSON  2,251,283
RECLOSABLE BOX
Original Filed Nov. 30, 1936  4 Sheets-Sheet 3
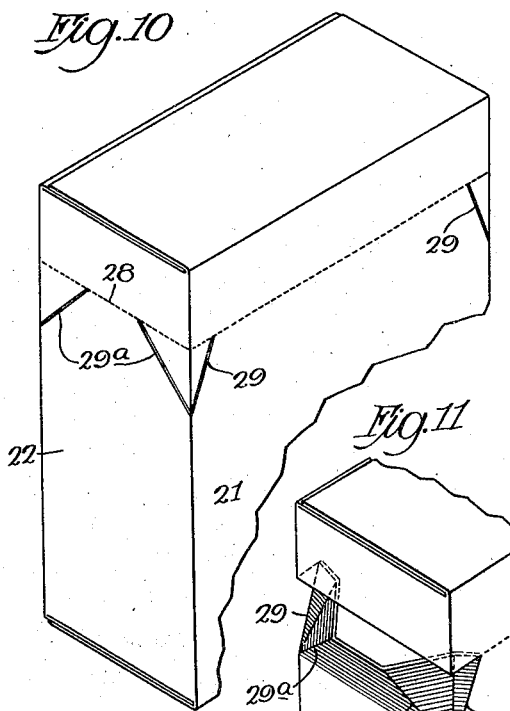
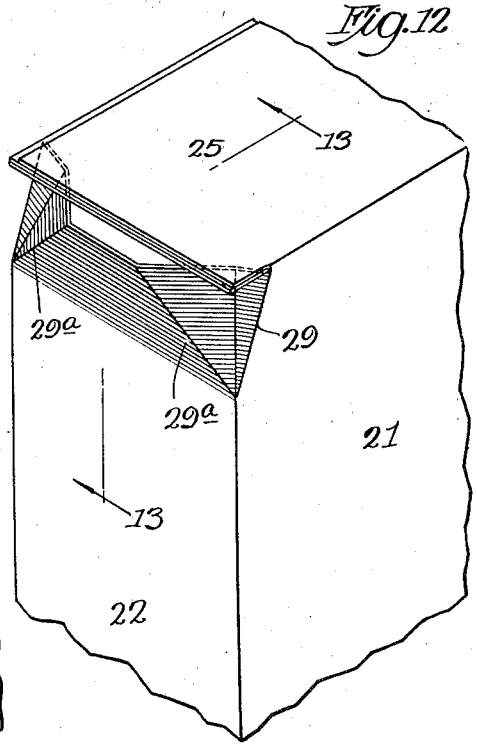
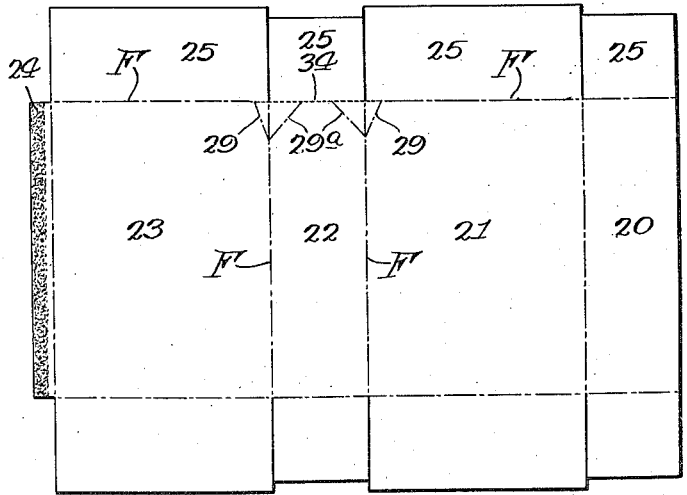
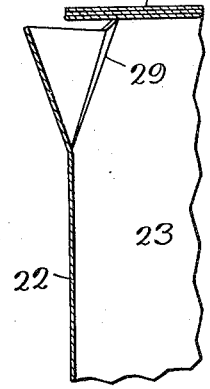
Inventor:
Edward W. Johnson
By Fisher, Clapp, Soans & Paul
Attys.

Aug. 5, 1941. E. W. JOHNSON 2,251,283
RECLOSABLE BOX
Original Filed Nov. 30, 1936   4 Sheets-Sheet 4
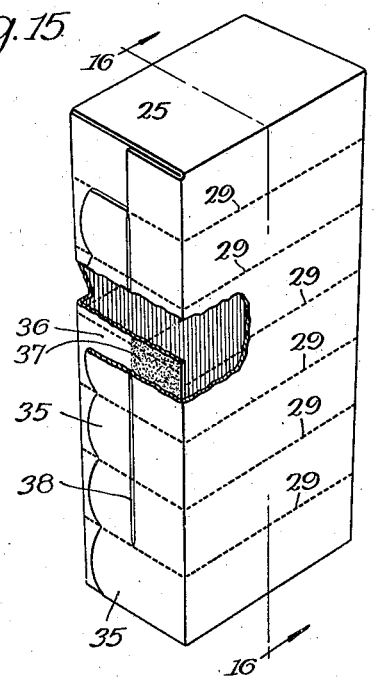
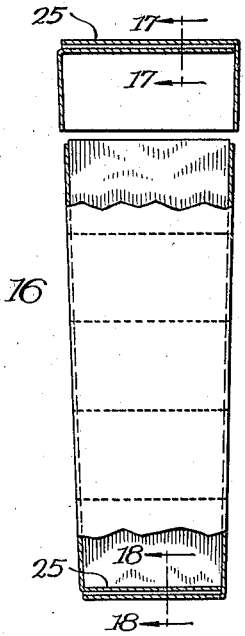
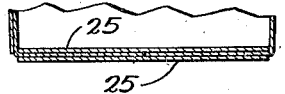
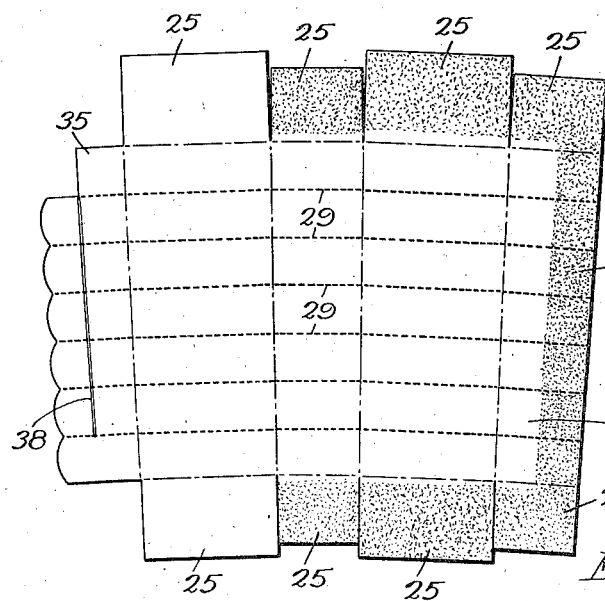
Inventor:
Edward W. Johnson
By Fisher, Clapp, Soans & Pond
Attys.

Patented Aug. 5, 1941

2,251,283

UNITED STATES PATENT OFFICE 2,251,283

RECLOSABLE BOX

Edward W. Johnson, Chicago, Ill., assignor, by mesne assignments, to Chicago Carton Company, Chicago, Ill., a corporation of Delaware Application November 30, 1936, Serial No. 113,459
Renewed September 28, 1939

9 Claims. (Cl. 229—37)

This invention relates to reclosable boxes and has particular reference to improvements in paper boxes of the type which are normally sealed closed and require cutting or tearing of some portion of the box for opening purposes.

The main objects of the invention are to provide a practical and convenient means for opening a box while incidentally providing means whereby the box may be reclosed; to provide such means whereby, if desired, the box may, instead of being fully opened, be merely partially opened to form a dispensing opening with or without a dispensing spout effect; to provide a box structure embodying the indicated features which may be made by conventional box making apparatus and without materially increasing the cost of the improved box structure over comparable conventional boxes; and, in general, it is the object of the invention to provide an improved reclosable box structure.

Other objects and advantages of the invention will be understood by reference to the following specification and accompanying drawings (four sheets) wherein there are disclosed several forms of boxes embodying the features of the present invention in various arrangements.

In the drawings—

Figure 1 is a perspective of a finished box embodying one form of the invention.

Figure 2 is a perspective showing the box of Figure 1 opened.

Figure 3 is a perspective showing the box of Figures 1 and 2 reclosed.

Figure 4 is a plan of the blank from which the box of Figure 1 is made.

Figure 10 is a perspective of a box embodying the reclosable construction of the box shown in Figures 1 to 4 inclusive, but modified in such a way that the box may be partially opened and provided with a dispensing spout.

Figure 11 is a fragmentary perspective of a portion of Figure 10 showing the box partially opened and provided with a dispensing spout.

Figure 12 is a fragmentary perspective showing the dispensing spout construction of the boxes of Figures 10 and 11 applied in a slightly different manner to a box.

Figure 13 is a section on the line 13—13 of Figure 12.

Figure 14 is a plan of a blank for forming a box embodying the spout construction shown in Figures 12 and 13.

Figure 15 is a perspective of a box embodying the reclosable construction of the boxes shown in both Figures 1 and 5, together with certain additional features.

Figure 16 is a section on the line 16—16 of Figure 15.

Figure 5:
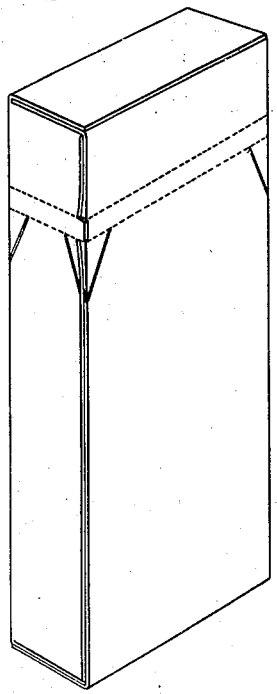
Figure 5 is a perspective showing another box construction embodying a reclosable arrangement.

Figures 17 and 18 are sections relatively on the lines 17—17 and 18—18 of Figure 17; and Figure 19 is a plan of a blank for forming the box shown in Figure 15.

Referring now to the drawings, and more particularly to Figures 1 to 4 inclusive, the box shown in said figures is formed from a generally rectangular cardboard blank provided with crease or fold lines designated F, which divide the blank into four panels designated 20, 21, 22 and 23, which are adapted to be folded to form a generally rectangular tubular box body. A gluing flap 24 is formed integral with one of the wall panels, in this instance with the wall panel 23. End closure flaps are also formed integrally with the relative side walls, the top flaps being designated 25 and the bottom flaps being designated 26. The flaps are separated by slitting indicated at S to facilitate their folding into overlapped relation for closing the upper and lower ends of the box.

The blank is folded and the flap 24 united to the inside of the narrow side wall 20 by means of a narrow strip of glue as indicated at 27. The top and bottom flaps 25 and 26 are folded into overlapping end closing arrangement and united by gluing or otherwise as is well understood in the art.

The blank for forming the box of Figure 1 is provided with a line of scoring 28 which extends the full length of the blank so as to extend around the box as will be apparent from an inspection of Figure 1. As indicated, the score line 28 is preferably spaced downwardly from the upper end of the side walls a predetermined distance which, in this instance, is approximately the same as the transverse dimension of the box across its narrow side walls. The relationship of the spacing of the score line 28 from the upper ends of the side walls of the box is obviously unimportant and that described is merely by way of one example. It may be varied considerably.

Angular creased lines designated 29 are also provided in each side wall of the box, such crease lines extending upwardly from predetermined points in the corner-forming crease or fold lines to the transverse score line 28, as clearly shown in Figure 4. When the blank is formed into a box as shown in Figure 1, the angular crease lines 29 are located in pairs at each corner of the box.

The box illustrated in Figure 1 may be opened by applying pressure to the side walls adjacent the score line 28 or by running the finger nail along said score line to break the bonds between the individual slits constituting the score line. By this means the box is divided into two parts, one being a receptacle designated R and the other a cover or cap designated C. The cap or cover is, of course, a flanged cover since portions of the side walls constitute flanges depending from the end closure 25.

It will, of course, be apparent that considerable difficulty would be experienced in attempting to telescope the upper, open end of the receptacle R into the flanged cap C inasmuch as both parts are of like cross sectional size. To facilitate such telescoping and reclosing of the receptacle, the triangular corner portions between the angular fold lines 29 may be folded or tucked inwardly as shown in Figure 2, such inward folding of the corner portions has the effect of slightly reducing the external dimensions of the upper end portion of the cover so as to facilitate the application of the flanged cap to the open end of the receptacle. In some instances the tucked in corner portions may not actually reduce the external dimensions of the upper end of the receptacle, but they do in any event serve in the nature of accordion folds which facilitate such collapsing of the upper end portions of the receptacle as is required for fitting the same into the flanged cap.

Referring now to Figures 5 to 9 inclusive, the blank and box formation there shown are generally similar to those shown in Figures 1 to 4 inclusive. However, in addition to the transverse line of scoring 28, the blank is provided with an additional line of scoring designated 30, the same being spaced upwardly a short distance from the scoring 28. The double line of scoring 28, 30 provides for the removal by tearing of a narrow strip of the box material completely around the same so as to separate the box into receptacle and cover portions, as clearly shown in Fig. 7. To facilitate removal of the strip designated 31, its free end in the wall portion 20 is preferably extended slightly beyond the normal line of the adjacent free edge of the blank and the said free edge is preferably slightly recessed as indicated at 32 on opposite sides of the strip and so as to in effect enlarge the end of the strip, thereby making it more readily accessible for removal. The blanks from which the boxes are formed are preferably cut from a continuous strip of suitable paper stock. The recessed arrangement around the free or tab end of the strip 31 results in a humped and notched effect on the free edge of the glue flap portion 24 as clearly shown in Figure 9. Inasmuch as the gluing flap is disposed inwardly of the narrow wall portion 20 when the box is formed, the said irregularity is of no consequence since it is adequately concealed.

For a purpose which will presently appear, a short slit designated 32 may be formed in the blank extending across the narrow removable strip 31, the said slit 30 being located in the line of fold between the glue flap 24 and the wall portion 23. The glue flap 24 is preferably adhesively united to the overlying wall portion 20 by means of a narrow strip of glue 27, as previously described, the said stripe crossing the strip portion 31 in the glue flap 24 in spaced relation to the ends of said strip portion.

Figure 6:
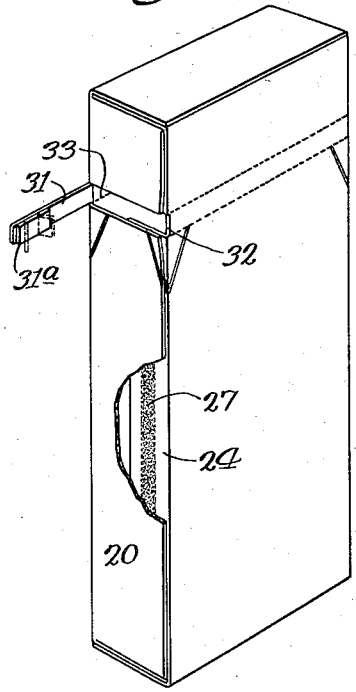
Figure 6 is a perspective showing the box of Figure 5 partially opened to provide a reclosable dispensing opening.
Figure 7:
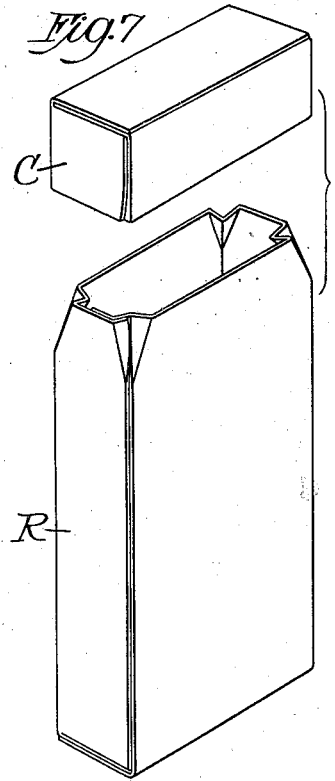
Figure 7 is a perspective showing the box of Figure 5 fully opened.
Figure 9:
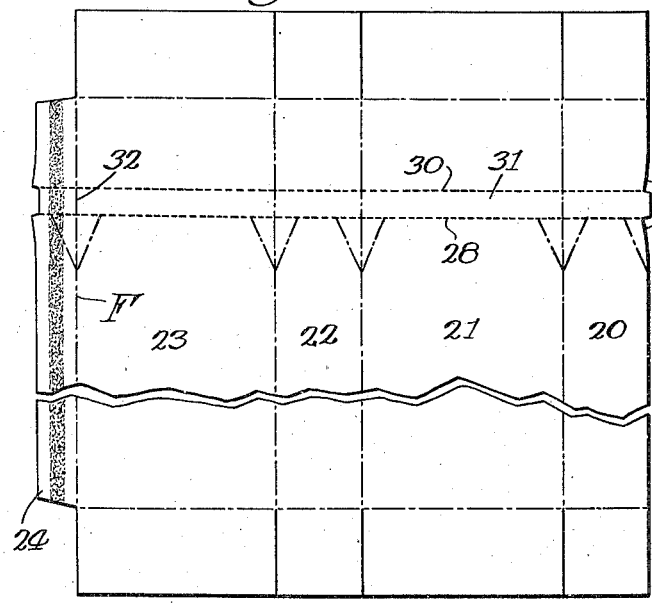
Figure 9 is a plan of a blank for forming the box of Figure 5.
Figure 8:
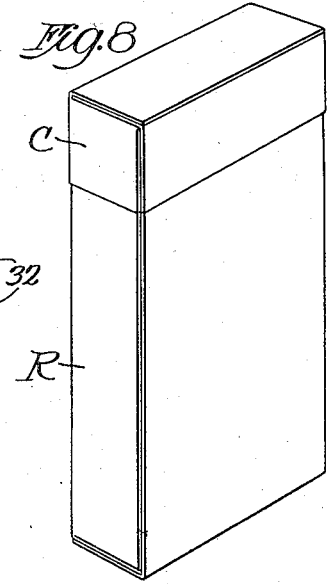
Figure 8 is a perspective showing the box of Figure 5 reclosed.

By reason of the arrangement described, the strip portion 31 in the wall 20 and in the glue flap 24 may be torn from the said wall and flap to provide a dispensing opening designated 33 as shown in Figure 6. For reclosing the opening, the pulled out strip portion 31, which remains integrally connected with the strip portion in the wall 21, may be rebent to its initial position in the box wall. To maintain the strip portion in such closed position, the strip portion designated 31a, which was initially a part of the glue flap 24, may have its end portions bent adjacent the edges of the glue stripe uniting said portion to the outer portion of the strip 31, so that said bent portions (indicated in dotted lines in Figure 6) will project into the box and will frictionally engage the adjacent box edges with the desired retaining effect. When it is desired to fully open the box, the strip 31 may be completely removed so as to separate the box into receptacle and cap portions, as shown in Figures 7 and 8. The upper corners of the receptacle portion may be folded inwardly as previously explained to facilitate application of the cap to the receptacle.

In Figures 10 and 11, there is shown a box in which there is a single line of scoring for facilitating separation of the box into receptacle and cover portions and in which the corner creasing on the receptacle portion is arranged to facilitate the provision of a dispensing spout if preferred to full opening of the box.

As shown, the angular crease lines 29a on the box wall 22 are disposed at a greater angle to the respectively adjacent vertical corner edges than the crease lines 29 on the adjacent sides. In this instance the angular crease lines 29a are illustrated as being applied to the side wall 22 of the box so as to avoid any interference from the lap joint between the wall 20 and the flap 24.

When the box is to be provided with a dispensing opening in preference to fully opening the same by separating the cap from the receptacle, the score line 28 is broken across the wall 22 and along the walls 21 and 23 only from the wall 22 to the upper ends of the adjacent angular creases 29. The corner portions defined by the pairs of upwardly diverging fold lines 29 and 29a may then be pressed inwardly to the position indicated in Figure 11. Owing to the short length of the upper edge of the inwardly folded portion of the walls 21 and 23 and the relatively long length of the upper edge of the inwardly folded corner portions of the wall 22, the portion of the wall 22 just below the line of separation 28 will be caused to bulge outwardly to form a spout substantially as illustrated in Figure 10. If at any time it is desired to complete the opening of the box, the cover may, of course, be separated from the receptacle by completing the separation along the scoring 28 and the application of the separated cover to the open end of the receptacle may be facilitated by continuing the inward bending of the spout-forming corner portions and also by bending inwardly the opposite corner portions as explained in connection with Figures 1 to 4 inclusive. The provision of angular crease lines on the box wall opposite the wall 22 may be for bending portions of equal size from the adjacent walls or it may be such as to provide a spout at either end as may be preferred.

The described means for providing a spout may be applied to a box without providing a score line for separating the box into receptacle and cover portions. For example, as shown in Figures 12, 13 and 14, the box may be provided with means for forming a spout which opens along a line immediately below the upper end closure 25.

By reference to the blank structure shown in Figure 14, it will be seen that the wall 22 is traversed by a score line 34 which is located in the line of fold which defines the upper end closure forming flaps 25. Angular score lines 29a are provided in the wall 22 connecting the respective wall corner-forming creases with said score line 34 and the adjacent walls 21 and 23 are provided with angular score lines 29 substantially as in the case of the construction shown in Figures 1 to 4 inclusive. The angular arrangement of the score lines 29a as compared with the angular arrangement of the score lines 29 is such that when the corner portions defined by the respective pairs of angular fold lines are adjusted inwardly, a spout will be formed as illustrated in Figures 12 and 13, the same being located immediately below the top end closure 25.

The box construction described in connection with Figures 1 to 13 inclusive are more particularly adapted for containing dry goods such as cereals, sugar, confections and other materials which may be poured. The package may, however, also be used with relatively solid forms of goods such as butter, lard, cheese and other materials, but for such purposes it is preferred to modify the package slightly to facilitate withdrawal of the entire brick of material from the container.

Accordingly, I have shown in Figures 15 to 19 inclusive the box as made of slightly tapered form so that at its upper end 25 it is somewhat larger in cross section than at its lower end. The extent of taper need not be great. By way of example, in one form of box which is approximately 4⅛" long, the dimensions of the large upper end may be 2³⁄₁₆" x 1¼", while the dimensions of the lower end may be approximately 2¹⁄₃₂" x 1⁷⁄₃₂".

In packaging materials such as mentioned, for example cheese, one of the end wall flaps 25 formed integral with one of the wider side walls at each end is turned inwardly to form the inner flap and the end wall forming flaps 25 from the narrow walls of the box are then turned inwardly so as to overlap the outside of the innermost side flap 25. Then the remaining wide flap 25 is folded into overlapping position on the outside of the two narrow flaps at each end. In this manner, the inside of the box is provided with substantially continuous wall surfaces and unnecessary crevices are avoided. The box may be lined with either a separate or attached metal foil lining or it may be coated with paraffin or other suitable material which has the effect of making the inside of the box impervious so as to adapt the box for the effective preservation of contents such as food stuffs.

Instead of a single line of scoring such as 29, extending around the box for facilitating separation of the same into a flanged cover and a receptacle part, the box is preferably provided with a plurality of such score lines disposed preferably in regularly spaced relation. For opening the package, one of the strips between adjacent score lines 29 may be torn out substantially as explained in connection with the strip 31 in the box construction shown in Figures 5 to 9 inclusive. For the purpose of facilitating removal of successive strips, the box is formed with a wide flap 35 which is adapted to overlie the wall forming panel 36 of the blank as indicated in Figure 15. The overlapping flap and wall portions 35 and 36 are preferably adhesively united along a narrow zone designated 37 adjacent the free edge of the wall portion 36. This arrangement leaves the outer marginal portion of the flap 35 free of attachment so that the end portions of each of the strips may readily be lifted and grasped for facilitating the operation of tearing the corresponding strip from the box. To facilitate such lifting of the end portions of the various strips, the flap 35 is provided with a fold line 38 which readily permits upward bending of the said strip ends. If preferred, the scoring 29 may be changed to slitting outwardly of the fold line 38, but this does not appear to be necessary inasmuch as the scoring is readily broken. Also it is somewhat advantageous to maintain the parts bonded together by scoring instead of separating them by slitting since there is less danger of the connected strip end portions being accidentally bent outwardly on the crease line 38.

To open the box illustrated in Figure 15, any one of the strip portions intermediate parallel score lines 29 may be removed. As a practical matter, the one intermediate the two uppermost score lines 29 is first removed. The remaining cap may then be removed, thereby leaving some of the package content projecting beyond the then upper edge of the receptacle part of the box. Such projecting part of the package content may then be sliced or otherwise cut away after which the flanged cap may be replaced on the box. Owing to the tapered form of the box, the cap will readily fit over the then upper end of the receptacle, the fit being sufficiently tight to serve all practical purposes. Successive strips may be removed to facilitate slicing of projecting portions of the package content. If, however, it is preferred to remove the entire package content, this may also readily be accomplished since the tapered form of the box readily releases the package content even though it be of a nature which tends to adhere to the walls of the box.

The described structures are such that they may readily be made on ordinary paper box-making equipment and they do not involve the employment of any material in addition to that which is normally employed in making boxes of the general form herein contemplated. The various box constructions described may be made rapidly and economically by usual methods of box construction.

Changes in the described constructions may be made without departing from the spirit of the invention, the scope of which should be determined by reference to the following claims, the same being construed as broadly as possible consistent with the state of the art.

I claim:

1. In a box which is of rectangular cross section, sealed closed and adapted to be opened by tearing the material of the box along predetermined lines, scoring extending around the box intermediate oppositely disposed walls, said scoring facilitating separation of the box into relatively independent parts, one constituting a receptacle and the other a flanged cover adapted to telescopically fit the open end portion of the receptacle to close the same, said receptacle part having fold lines extending downwardly from inwardly disposed points in the open-end edges of adjacent walls, said fold lines extending toward the corner formed by the walls having said fold lines and cooperating to form an inwardly foldable corner portion, serving, when folded inwardly, to reduce the external size of the receptacle adjacent its open end, thereby to facilitate telescoping of said cover part externally on said receptacle part.

2. In a box which is of rectangular cross section, sealed closed and adapted to be opened by tearing the material of the box along predetermined lines, scoring extending around the box intermediate oppositely disposed walls, said scoring facilitating separation of the box into relatively independent parts, one constituting a receptacle and the other a flanged cover adapted to telescopically fit the open end portion of the receptacle to close the same, said receptacle part having adjacent each corner formed by adjacent side walls, fold lines extending downwardly from inwardly disposed points in the open-end edges of adjacent walls, said fold lines extending toward the corner formed by the walls having said fold lines and cooperating to form inwardly foldable corner portions, serving, when folded inwardly, to reduce the external size of the receptacle adjacent its open end, thereby to facilitate telescoping of said cover part externally on said receptacle part.

3. In a box which is sealed closed and adapted to be opened by tearing the material of the box along predetermined lines, a pair of relatively spaced score lines, each extending substantially continuously around the box intermediate oppositely disposed walls, said score lines facilitating the removal by tearing of a predetermined strip of the box material so as to separate the box into relatively independent parts, one constituting a receptacle and the other a flanged closure adapted to telescopically fit the open end of the receptacle to close the same, and means for facilitating infolding of predetermined corner portions of the receptacle adjacent its open-end, thereby to facilitate telescoping of said cover part externally on said receptacle part.

4. A box which is sealed closed, the box being formed from a blank bent to box form and having relatively overlapped portions united together, a pair of relatively spaced score lines traversing said overlapped portions for facilitating separation from the box portions outwardly of said score lines, of the overlapped portions intermediate said lines, said intermediate portion having one end severed from the box blank and being integrally united to the box at its other end, said intermediate portion being bendable to outwardly offset position leaving a dispensing opening in the box, the overlapped portions intermediate said score lines being united in only a portion of their length so that an end portion of the innermost lap is bendable to angular relation to the outermost lap and adapted to project into the box through said dispensing opening in frictional engagement with an edge portion of the opening to hold the outer lap in rebent position closing said opening.

5. In a box which is of rectangular cross section, sealed closed and adapted to be opened by tearing the material of the box along predetermined lines, scoring in the side walls of the box and extending substantially continuously around the same and intermediate the end walls but nearer to one end than to the other, said scoring facilitating separation of the box into relatively independent parts, one a receptacle and the other a flanged cover adapted to telescopically fit over the open end of the receptacle, one of the side walls having a pair of oppositely outwardly diverging fold lines extending from the scoring therein and the respectively adjacent side walls being each provided with a fold line extending angularly downwardly from the scoring therein and adapted to cooperate with the adjacent fold line in said first mentioned side wall to facilitate inward bending of portions of the receptacle walls adjacent the open end of the receptacle to facilitate telescoping of said cover over said receptacle, the widths of the inwardly foldable first mentioned side wall portions being greater than the widths of the respective cooperating side wall portions whereby said cooperating foldable portions are operative to form an outwardly projecting dispensing spout when in an intermediate, inwardly folded position.

6. A box having a pair of side walls and an intermediate wall, the side walls respectively extending angularly from the opposite edges of said intermediate wall, said intermediate wall having scoring extending transversely thereof from one of said opposite edges to the other, said side walls having scoring therein extending substantially in continuation of the scoring in said intermediate wall, pairs of fold lines associated respectively with the corners formed between said intermediate and side walls, each pair including a fold line in the intermediate wall and a cooperating fold line in the adjacent side wall, the fold lines of each of said pairs extending in diverging relationship from points spaced from said scoring, toward said scoring, the fold lines in said intermediate wall being arranged at a greater angle to the respective corners than the respective cooperating fold lines in said side walls, said scoring and fold lines facilitating the formation of a dispensing spout substantially as described.

7. In a box which is sealed closed and adapted to be opened by tearing the material of the box along predetermined lines, scoring extending around the box intermediate oppositely disposed walls, said scoring facilitating separation of the box into relatively independent parts, one of said parts being adapted to serve as a flanged cover for the other part, one of said parts having adjacent its open end and in adjacent walls, fold lines extending longitudinally of said walls from points spaced from the corner formed by said walls toward said corner, said fold lines cooperating to form an inwardly foldable corner portion, serving, when folded inwardly, to reduce the external size of the part adjacent its open end, thereby to facilitate insertion thereof into the other of said parts.

8. A box having a pair of side walls and an intermediate wall, the side walls respectively extending angularly from the opposite edges of said intermediate wall, said intermediate wall having scoring extending transversely thereof from one of said opposite edges to the other, said side walls having scoring therein extending substantially in continuation of the scoring in said intermediate wall, pairs of fold lines associated respectively with the corners formed between said intermediate and side walls, each pair including a fold line in the intermediate wall and a cooperating fold line in the adjacent side wall, the fold lines of each of said pairs extending in diverging relationship toward said scoring from points spaced from said scoring, said scoring and fold lines facilitating the formation of a dispensing spout substantially as described.

9. A paper board box having a pair of side walls and an intermediate wall, the side walls respectively extending angularly from the opposite edges of said intermediate wall, and means adjacent one end of the box for facilitating offsetting of portions of said walls to form a pouring spout, said means comprising two pairs of fold lines associated respectively with the adjacent corners formed between said intermediate and side walls, each pair including a fold line in the intermediate wall and a cooperating fold line in the adjacent side wall, the fold lines of each of said pairs extending in diverging relationship toward said end of the box from points spaced therefrom, said intermediate and side walls having a weakened line intersecting the fold lines adjacent the end of the box.

EDWARD W. JOHNSON.